United States Patent
Bishop et al.

(10) Patent No.: US 9,767,222 B2
(45) Date of Patent: Sep. 19, 2017

(54) INFORMATION SETS FOR DATA MANAGEMENT

(71) Applicant: International Business Machines Corporation, Armonk, NY (US)

(72) Inventors: Thomas P. Bishop, Austin, TX (US); Kevin Chee, Austin, TX (US); Jozsef Szalay, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 87 days.

(21) Appl. No.: 14/038,919

(22) Filed: Sep. 27, 2013

(65) Prior Publication Data

US 2015/0095340 A1   Apr. 2, 2015

(51) Int. Cl.
*G06F 17/30* (2006.01)

(52) U.S. Cl.
CPC .............. *G06F 17/30997* (2013.01)

(58) Field of Classification Search
CPC ............... G06F 17/30321; G06F 17/30598
USPC .......... 707/737, 741, 754, 756, 711
See application file for complete search history.

(56) References Cited

U.S. PATENT DOCUMENTS

| | | | |
|---|---|---|---|
| 6,012,067 A | 1/2000 | Sarkar | |
| 6,219,670 B1 | 4/2001 | Mocek et al. | |
| 6,263,334 B1 | 7/2001 | Fayyad et al. | |
| 6,745,176 B2 | 6/2004 | Probert, Jr. et al. | |
| 6,954,758 B1 | 10/2005 | O'Flaherty | |
| 7,219,099 B2 | 5/2007 | Kuntala et al. | |
| 7,676,553 B1 * | 3/2010 | Laucius ............ G06F 17/30864 | 709/219 |

(Continued)

FOREIGN PATENT DOCUMENTS

| | | |
|---|---|---|
| CN | 102955848 | 3/2013 |
| CN | 102968495 | 3/2013 |

(Continued)

OTHER PUBLICATIONS

PCT International Search Report and Written Opinion, PCT/CN2014/084172, Nov. 15, 2014, 12 pages.

(Continued)

*Primary Examiner* — Robert Beausoliel, Jr.
*Assistant Examiner* — Alexandria Bromell
(74) *Attorney, Agent, or Firm* — Yeen Tham; Edell, Shapiro & Finnan, LLC

(57) ABSTRACT

According to one embodiment of the present invention, a system selects member objects from among data objects stored in one or more data sources by evaluating criteria against information about the data objects in an index, wherein the information about the data objects in the index is derived from the data sources. The system creates a set of data objects comprising a collection of references to the selected member objects, and associates the set with a set-identifier. The system receives a request to apply an action to a subset of the data objects stored in the one or more data sources, wherein the request specifies the subset by including the set-identifier, and applies the action to the set of data objects associated with the set-identifier within the request. Embodiments of the present invention further include methods and computer program-products for managing data in substantially the same manners described above.

17 Claims, 8 Drawing Sheets

(56) References Cited

U.S. PATENT DOCUMENTS

| | | | |
|---|---|---|---|
| 7,856,434 B2* | 12/2010 | Gluzman Peregrine | G06F 17/30864 707/722 |
| 8,046,338 B2 | 10/2011 | Basso et al. | |
| 8,200,569 B1 | 6/2012 | Zerenner et al. | |
| 8,447,722 B1 | 5/2013 | Ahuja | |
| 2001/0056429 A1 | 12/2001 | Moore | |
| 2004/0125131 A1 | 7/2004 | Phelps | |
| 2005/0289524 A1* | 12/2005 | McGinnes | G06F 8/10 717/140 |
| 2006/0161556 A1 | 7/2006 | Dettinger et al. | |
| 2007/0185904 A1 | 8/2007 | Matsuzawa et al. | |
| 2007/0214135 A1 | 9/2007 | Crivat et al. | |
| 2008/0027893 A1 | 1/2008 | Cavestro et al. | |
| 2008/0201277 A1 | 8/2008 | Ozdemir et al. | |
| 2009/0282066 A1 | 11/2009 | Russell et al. | |
| 2010/0145917 A1* | 6/2010 | Bone | G06F 17/30082 707/694 |
| 2010/0179951 A1 | 7/2010 | McPhail et al. | |
| 2012/0041979 A1* | 2/2012 | Lee | G06N 5/022 707/776 |
| 2012/0173506 A1 | 7/2012 | Wilansky et al. | |
| 2012/0214159 A1* | 8/2012 | George | G06F 19/10 435/6.11 |
| 2012/0254134 A1 | 10/2012 | Talati et al. | |
| 2013/0024424 A1* | 1/2013 | Prahlad | G06F 17/302 707/640 |
| 2013/0066921 A1 | 3/2013 | Mark | |
| 2013/0073400 A1* | 3/2013 | Heath | G06Q 30/02 705/14.73 |
| 2015/0019559 A1* | 1/2015 | Maquaire | G06F 17/30997 707/740 |
| 2015/0052158 A1 | 2/2015 | Bishop et al. | |
| 2015/0052162 A1 | 2/2015 | Arnold et al. | |
| 2015/0149491 A1 | 5/2015 | Redlich | |
| 2015/0278286 A1 | 10/2015 | Arnold et al. | |
| 2015/0278340 A1 | 10/2015 | Bishop et al. | |

FOREIGN PATENT DOCUMENTS

| | | |
|---|---|---|
| EP | 2474935 | 7/2012 |
| GB | 2338324 | 12/1999 |
| WO | 03065179 | 8/2003 |
| WO | 2005038689 | 4/2005 |

OTHER PUBLICATIONS

PCT International Search Report and Written Opinion, PCT/CN2014/084211, Nov. 18, 2014, 11 pages.
EMC Corp., EMC Captiva: Intelligent Enterprise Capture, http://web.emc.com/emc-captiva-capture?cmp=knc-IIG_Divisional-Captiva-DocIndex-INT&activity_id=218623&division=iig, accessed Aug. 7, 2013, 1 page.
StoredIQ, IQ Platform, http://www.storediq.com/applications/platform, accessed Aug. 9, 2013, 4 pages.
Taiwan Office Action dated Aug. 19, 2016, 6 pages.
Taiwan Search Report dated Aug. 19, 2016, 1 page.

* cited by examiner

INFORMATION SETS FOR DATA MANAGEMENT

CROSS-REFERENCE TO RELATED APPLICATIONS

This application claims priority from U.S. Provisional Patent Application Ser. No. 61/866,202, titled "Utilization of a Concept to Obtain Data of Specific Interest to a User From One or More Data Storage Locations" and filed Aug. 15, 2013, and from U.S. Provisional Patent Application Ser. No. 61/866,258, titled "Incrementally Retrieving Data for Objects to Provide a Desired Level of Detail" and filed Aug. 15, 2013, the disclosures of which are incorporated herein by reference in their entireties.

BACKGROUND

1. Technical Field

Present invention embodiments relate to information management, and more specifically to managing sets of data objects.

2. Discussion of the Related Art

Legal documents and documents containing answers to attorney questions are example market segments for which many businesses need data mining and control assistance. When dealing with large amounts of files and emails across several different data servers, it becomes increasingly difficult to identify the information needed by a particular business application. A variety of tools allow for searching, categorizing, or grouping files and other data. Generally, these tools copy or move the files and other data into data repositories for large scale searches or categorization. However, it remains a challenge to identify and group this information in an unobtrusive manner that allows a wide variety of business applications to access and use the data.

BRIEF SUMMARY

According to one embodiment of the present invention, a system selects member objects from among data objects stored in one or more data sources by evaluating criteria against information about the data objects in an index, wherein the information about the data objects in the index is derived from the one or more data sources. The system creates a set of data objects comprising a collection of references to the selected member objects, and associates the set with a set-identifier. The system receives a request to apply an action to a subset of the data objects stored in the one or more data sources, wherein the request specifies the subset by including the set-identifier, and applies the action to the set of data objects associated with the set-identifier within the request. Embodiments of the present invention further include a method and computer program product for managing data using sets of data objects in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments pertain to managing information by identifying and operating upon sets of data objects, in one scenario, a framework provides for managing data objects (e.g., files, emails, etc.) and associated metadata maintained across various data repositories while the information remains intact (e.g., without having to replicate the data objects (e.g., to another repository)). The repositories are accessed via adaptors with authentication to retrieve and/or modify the data stored therein. Metadata for the data objects (e.g., filename, location, owner, document type, timestamps, email subject, department, organization, vendor, product, custodian, object properties, etc.) is extracted and inserted in an index that may be stored outside the repositories.

Users may create virtual data containers (referred to as "information sets") to represent classes of data objects based on information in the index. For example, users may provide criteria for membership (e.g., mp3 files created within the past three months) to generate an information set representing files that satisfy the criteria. A computer system searches all or part of the index, tagging objects that satisfy the criteria with an identifier for the information set. In addition, a list of those objects is created and stored.

Once generated, the information set provides quick access to the data through the stored list. The information set may be used and reused to apply operations (e.g., copy, move, delete, export to an application, etc.) against the data. Given an information set, users may provide additional criteria to derive a further refined information set from the given information set. Users may apply set operations to information sets (e.g., union, intersection, etc.), and may generate new information sets based on the results.

One aspect of a present invention embodiment is to provide "snapshots" of users data in time. In one embodiment, information sets are immutable. As the underlying indexes are updated or recreated, new information sets may be created to reflect those changes. In addition, information sets may be used in conjunction with one another to show comparisons of data over time. For example, information sets may provide a historical view of data, e.g., showing data growth over time, verifying the effectiveness of data cleanup or compliance rules, etc.

Another aspect of a present invention embodiment is to enable users to understand a large volume of data that may be contained within an enterprise by providing a variety of operations and uses that may be applied in combination. Accordingly, information sets may be used to provide a variety of visualizations and reports to enable users to understand the data and changes to the data.

Figure 1:
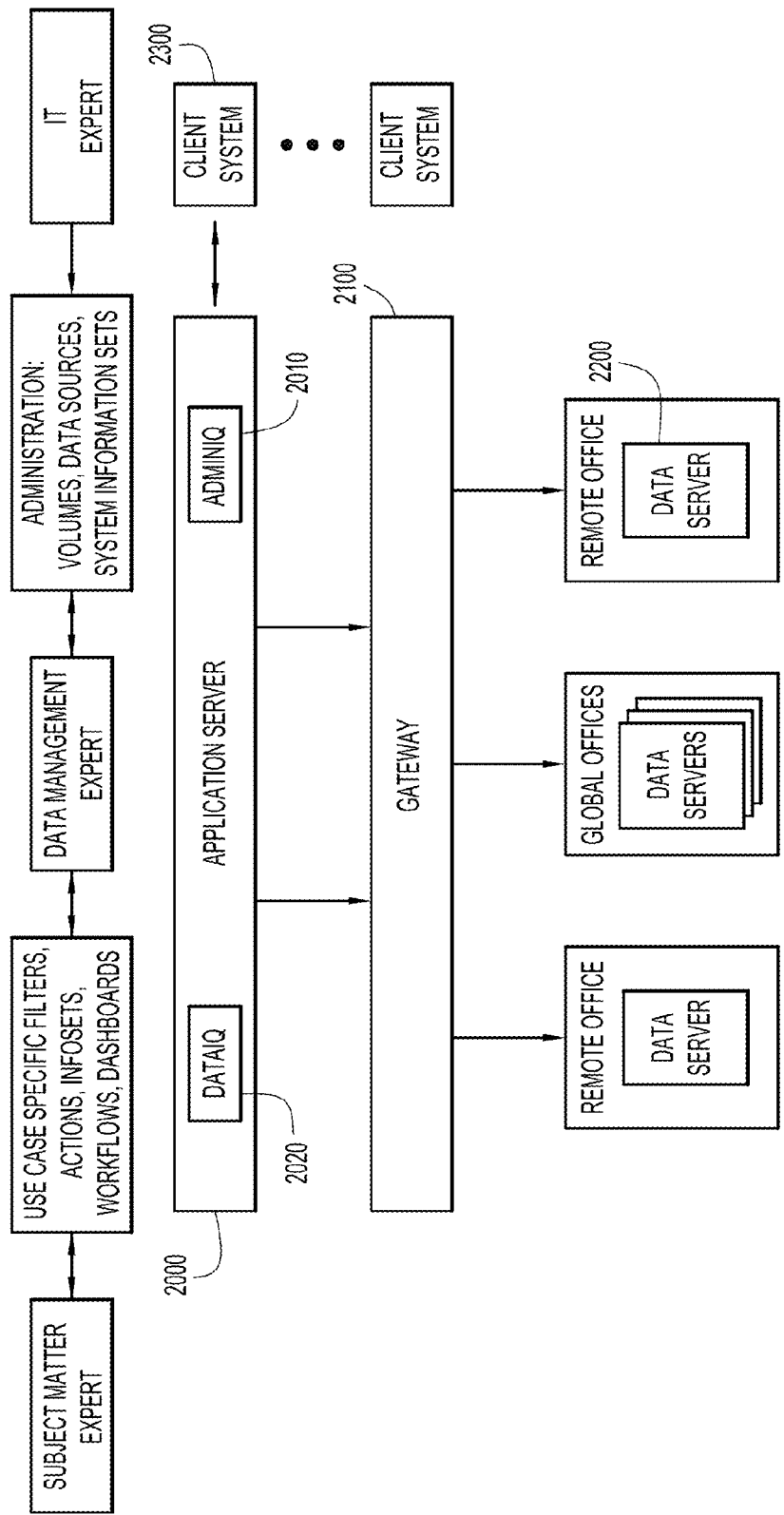
FIG. 1 is a diagrammatic illustration of an example computing environment of an embodiment of the present invention.
Figure 2:
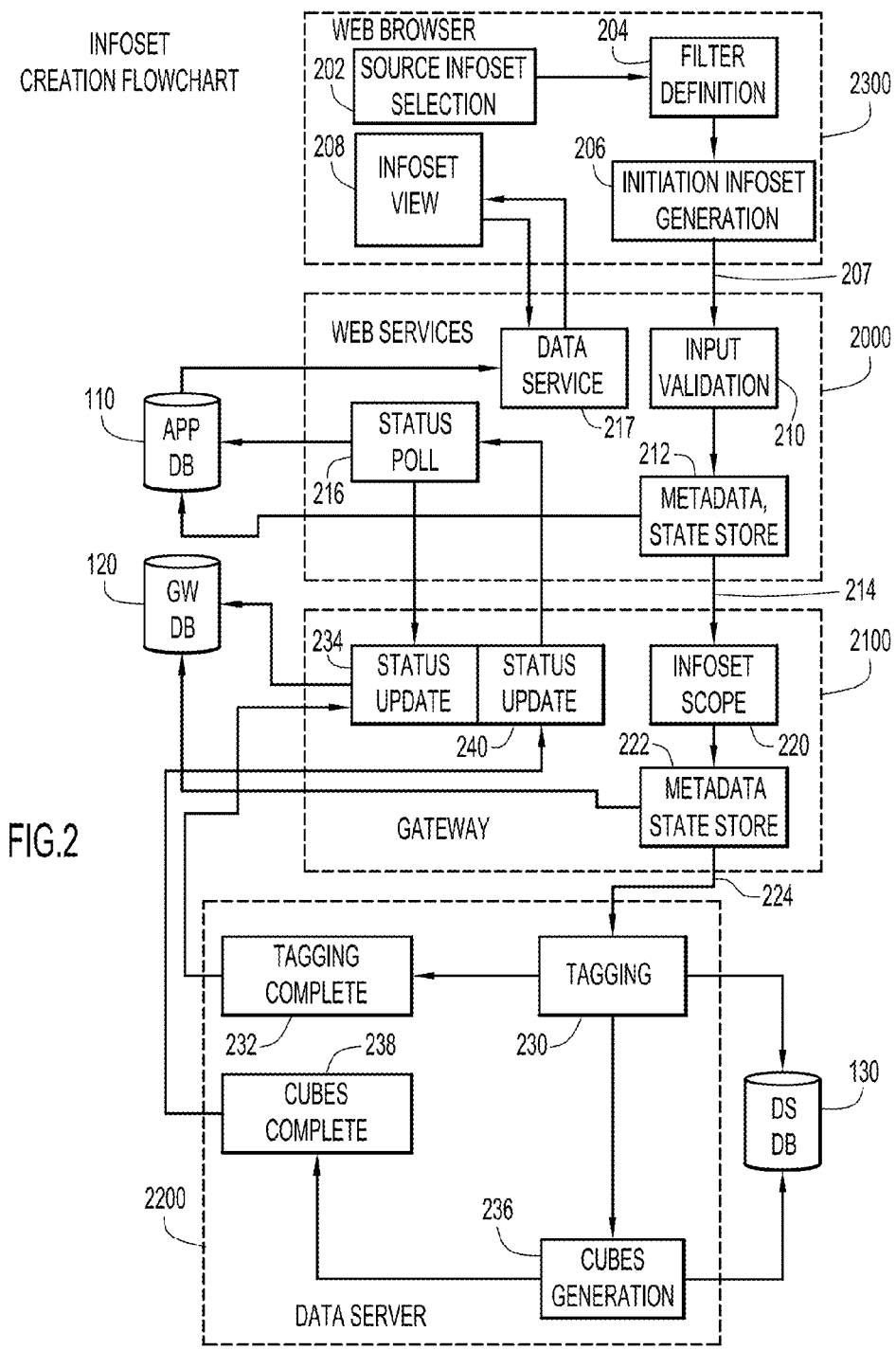
FIG. 2 is a flow diagram of an example manner of creating an information set according to an embodiment of the present invention.
Figure 3:
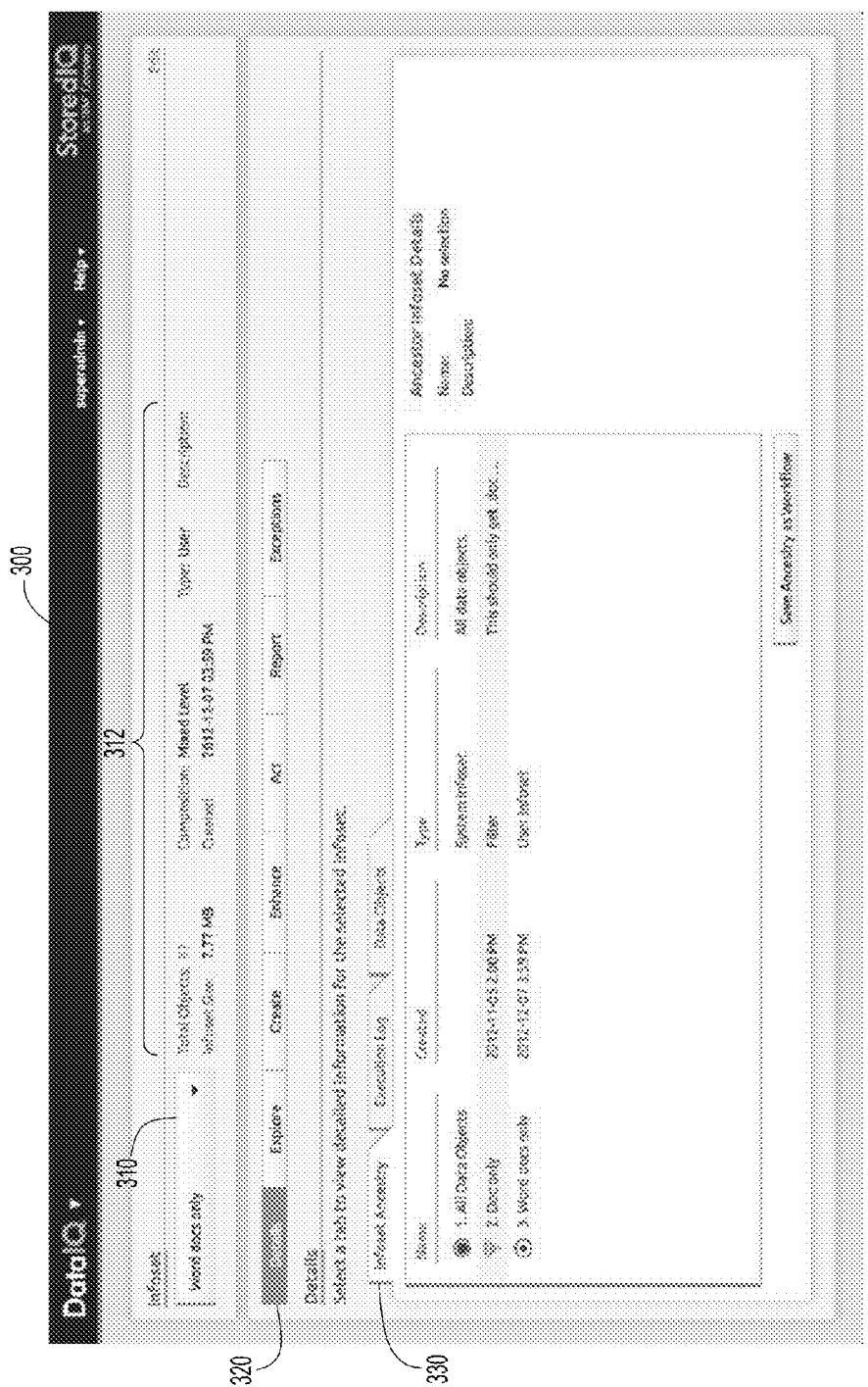
FIG. 3 is a schematic illustration of an example graphical user interface screen for selecting a source information set according to an embodiment of the present invention.
Figure 4:
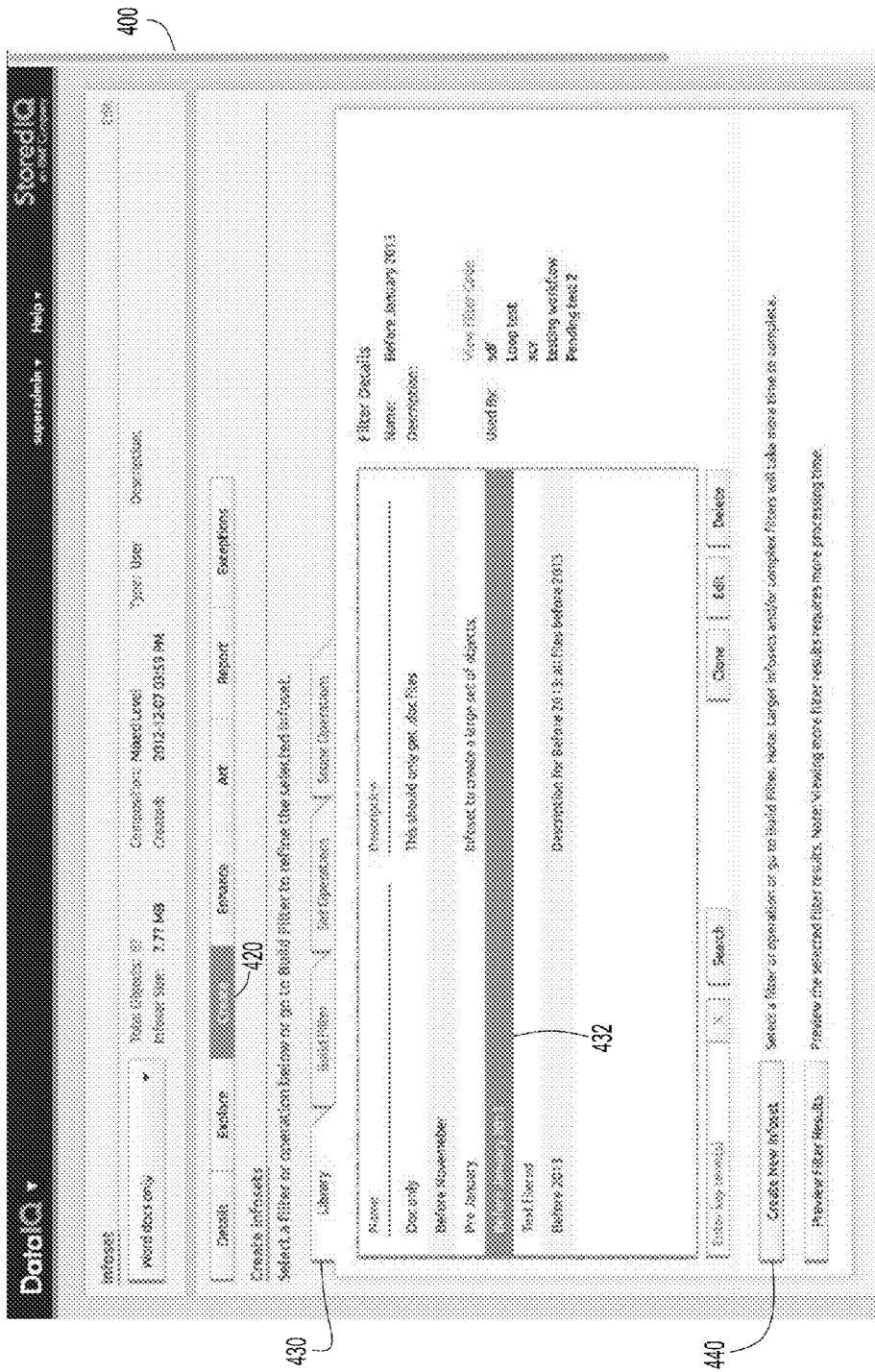
FIG. 4 is a schematic illustration of an example graphical user interface screen for selecting a filter for creating an information set from a source information set according to an embodiment of the present invention.
Figure 5:
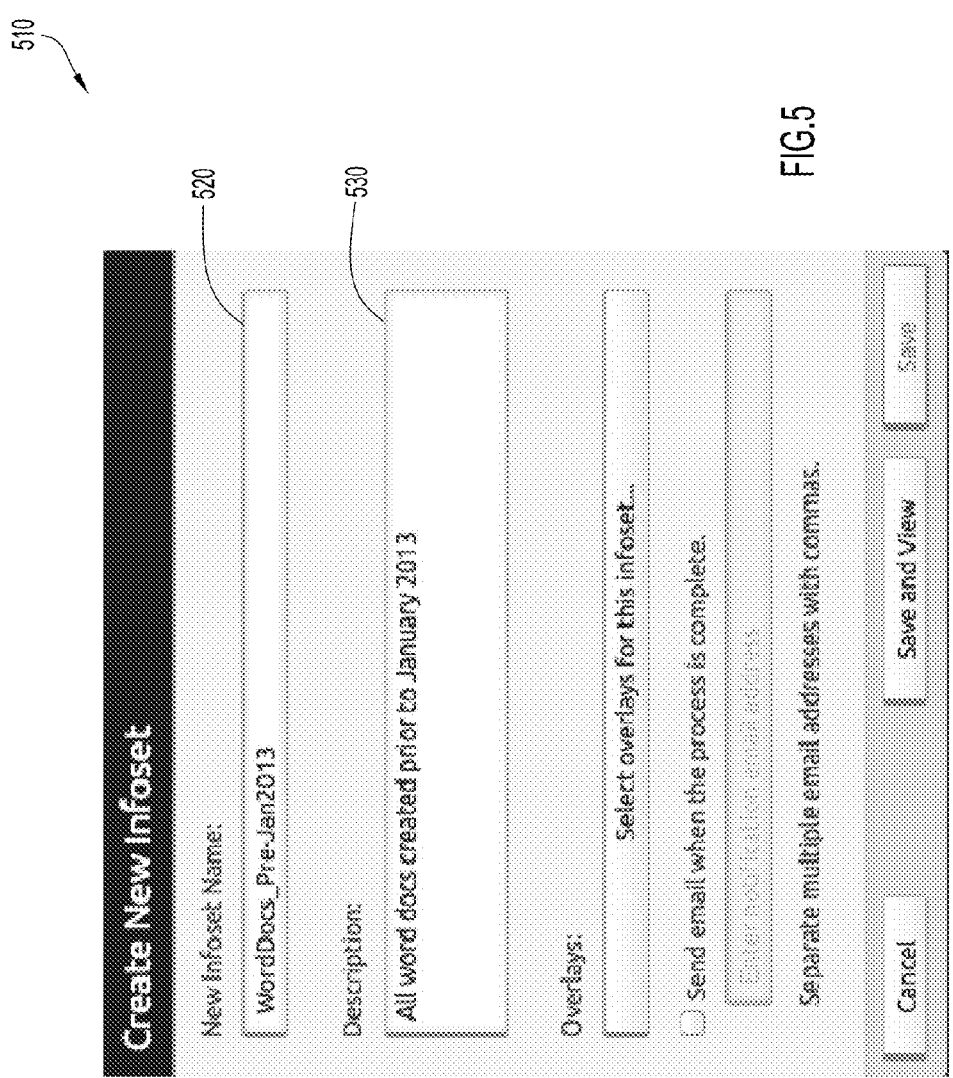
FIG. 5 is a schematic illustration of an example graphical user interface screen for entering a name and other metadata for an information set according to an embodiment of the present invention.

An example environment for use with present invention embodiments is illustrated in FIG. 1. The environment provides data management for data that remains intact within data repositories. Specifically, the environment includes an application server system (or application stack) 2000, a gateway system 2100, one or more data server systems 2200, and one or more client or end-user systems 2300 to enable users and/or administrators to access the various data management services. The application server system, gateway system, data server systems, and client systems may be remote from each other and communicate over a network. The network may be implemented by any number of any suitable communications media (e.g., wide area network (WAN), local area network (LAN), Internet, Intranet, etc.). Alternatively, these systems may be local to each other, and communicate via any appropriate local communication medium (e.g., local area network (LAN), hardwire, wireless link, Intranet, etc.).

The application server system (or application stack) provides the backbone for a browser-based graphical user interface (GUI), and holds and provides information (e.g., metadata, state information, etc.) about application objects. The application server includes an administration component 2010 and a data component 2020. The administration component provides various administration tasks (e.g., configuration of volumes, data sources, system information sets, use case specific filters, actions, information sets, workflows, dashboards, etc.). These tasks may be performed by various users (e.g., Information Technology (IT), data management, and subject matter experts, etc.). The data component provides data management tasks for end-users (e.g., creation of information sets, performance of data expansion, etc.).

Gateway system 2100 serves as a gateway between application server system (or application stack) 2000 and data server systems 2200, and relays commands from the application server system to the data server systems. The data server systems register with and connect to the gateway system, where the gateway system maintains up-to-date information about the registered and connected data server systems. The gateway system further holds additional, and in some cases, more detailed metadata and status information about application-level objects, and also maintains certain types of data that are aggregated from the data server systems.

One or more data server systems 2200 may reside at various local or remote locations (e.g., remote offices, global offices, etc.) to access data of a customer or consumer of the data management services. The data server systems may be scaled out horizontally to meet processing needs. The data server systems have connectors to many types of customer or consumer data sources where their data resides. These connectors have the ability to interrogate, to harvest and, in most cases, to modify the content of the data sources. Further, each data server maintains an index (or portion of an index) for whatever it has collected from the customer data servers that were assigned to the data server systems. The data server systems basically do the heavy lifting in terms of collecting data, executing actions, performing searches, and deeper analysis. Thus, the data server systems provide access to customer or consumer data to enable management of that data while the customer data remains intact within the customer data repositories or server systems.

Application server system 2000, gateway system 2100, data server systems 2200 and client systems 2300 may be implemented by any conventional or other computer systems preferably equipped with a display or monitor, a base (e.g., including at least one processor, one or more memories and/or internal or external network interfaces or communications devices (e.g., modem, network cards, etc.)), optional input devices (e.g., a keyboard, mouse or other input device), and any commercially available and custom software (e.g., server/communications software, data and administration components, browser/interface software, etc.). These systems may include one or more modules or units to perform the various functions of present invention embodiments described below. The various modules may be implemented by any combination of any quantity of software and/or hardware modules or units, and may reside within memory of the application server, gateway, data server and/or client systems for execution by a system processor.

An information set provides a virtual data "container" for data that has been indexed by data server systems 2200. For example, each file or other data object in the index may have an object identifier, and the information set may have a table containing a list of object identifiers. The object identifiers may be monotonically assigned integers, initial allocation pointers, or any other type of unique identifier. Thus, an information set may serve as a table of references to objects or records in the index.

The system may automatically generate one or more information sets. For example, when the index is updated, the system may generate an information set for the entire index (which may comprise, e.g., a plurality indexes for individual data volumes distributed over data server systems 2200) and information sets for individual data volumes.

A user interface (UI) may allow a user to define rules for criteria (e.g., specifying an identity, department, organization, vendor, product, custodian, object properties, attributes, etc.) to encapsulate indexed data, create an information set of the indexed data meeting the criteria, adjust the criteria to form a new information set, perform set operations (e.g., comparison, union, intersection, complement, symmetric difference, etc.) on information sets, present reports of the results of the operations, convert the criteria to adaptors with filters to retrieve the data satisfying the criteria, review a small sample of data designated by an information set, generate a report for an information set, share an information set's data with another application, refresh/extend/reduce the index for information designated by an information set, identify changes, identify and remove elements that refer to identical data objects, etc.

A manner of creating an information set from a source information set according to an embodiment of the present invention is illustrated in FIGS. 2-5. Initially, at step 202, a user selects a source information set via a browser-based graphical user interface screen 300 (FIG. 3) provided by a web browser of a client system 2300. For example, user interface screen 300 may include drop-down list control 310 for selecting an information set by name. A user may generate a new information set from all data objects (e.g., by selecting the system-generated information set of all data objects as the source information set). Alternatively, the user may create a new information set from a previously generated user-defined information set.

User interface screen 300 may further include summary information 312 (e.g., total number of objects in the information set, size of the information set in megabytes, data and time created, description, etc.), "Details" navigator bar option 320 enables a user to view details (e.g., ancestry, execution log, data objects) of the selected information set, and other information and/or controls. For example, the user may review ancestry 330 of an information set named "Word docs only" to see that the information set was created from a system provided information set containing all data objects by selecting files with a ".doc" extension from that system-provided information set.

At step 204, the user selects a filter to further narrow down the content of the source information set. For example, the user may select the "Create" navigation bar option 420 of screen 400 (FIG. 4) to display a library 430 of existing filters and choose filter 432 for selecting files created before January, 2013. The user may choose to create a new information set using the selected source and filter by actuating the "Create New Infoset" button 440.

In addition, the user may choose options for handling composite data objects (e.g., zip files, tar files, emails with attachments, etc.). For example, a zip file that belongs to the parent information set may be treated as a single object to be included or excluded from the new information set. Alternatively, each file or other object within the zip file may be included or excluded on an individual basis. The user may have the option to specify a depth to which composite objects of various types will be expanded. Components of a composite object that appear as separate members of the parent information set may be rolled up.

At step 206, the user names the new information set and initiates its generation. For example, the user may enter a name in text box 520 of dialog screen 510 (FIG. 5) and may enter other metadata for the information set, e.g., a description using text box 530. Generation of the information set is initiated when the user saves this information. In particular, the browser of client system 2300 communicates the user input defining the new data set to web services of application server system 2000 at step 207. At step 208, the user may monitor the progress towards generating the information set by selecting the new information set using screen 300 (FIG. 3) and periodically refreshing the screen to view, e.g., summary information 312, state information, history of events, actions available, etc.

At step 210, web services of application server 2000 validates the user input and reports any errors to the browser of client system 2300. The web services of application server 2000 stores metadata and state information in its database, application server database 110, at step 212. At step 214, the web services of application server 2000 instruct gateway 2100 to start creating the information set. Web services of application server 2000 also initiates status polling for the information set being created in order to learn about any change in the processing and final states at step 216.

At step 220, gateway 2100 determines the scope of the work to be performed. In particular, gateway 2100 determines which data servers 2200 will participate in performing the work. This may be determined using metadata of the source information set (e.g., where the source data resides) and state information of the data servers. At step 222, the gateway stores metadata of the new information set and prepares detailed state information for the participating data servers 2200 in its own database, gateway database 120. At step 224, the gateway instructs each participating data server to start the information set creation. The data servers may perform their assigned work concurrently and independently from each other.

At step 230, data servers 2200 tag objects that will belong to the new information set. In particular, the data servers generate and store in data server database 130 references to objects that are members of the source information set and that also satisfy the filter expression. The data servers determine membership based on information stored in their indexes. Thus, the data sources where the users' actual data reside are not accessed during the process of creating the new information set. The data servers may divide the membership generation into smaller tasks that can run in parallel for efficiency.

Data servers 2200 notify gateway 2100 at step 232 each time one of the smaller tagging tasks completes. The gateway receives these notifications at step 234. In response, the gateway updates the detailed state information of the new information set in gateway database 120. This updated state information is then sent to web services of application server 2000 when the web services requests an update at step 216.

Data servers 2200 generate and store aggregated information about the content of the new information set in data server database 130 at step 236. This information may be stored in, e.g., multidimensional data structures (referred to herein as a cube). The data servers may divide cube generation into smaller tasks that can run in parallel for efficiency. The data servers notify gateway 2100 each time when a smaller cube generation task is complete at step 238. The gateway receives these notifications at step 240 and updates the information set's detailed state information in gateway database 120. This updated state information is then sent to the web services of application server 2000 when the web services ask for an update at step 216.

The information set generation is considered complete when every smaller task on every participating data server is finished, and the state information is updated at the gateway and at the application server levels.

Figure 6:
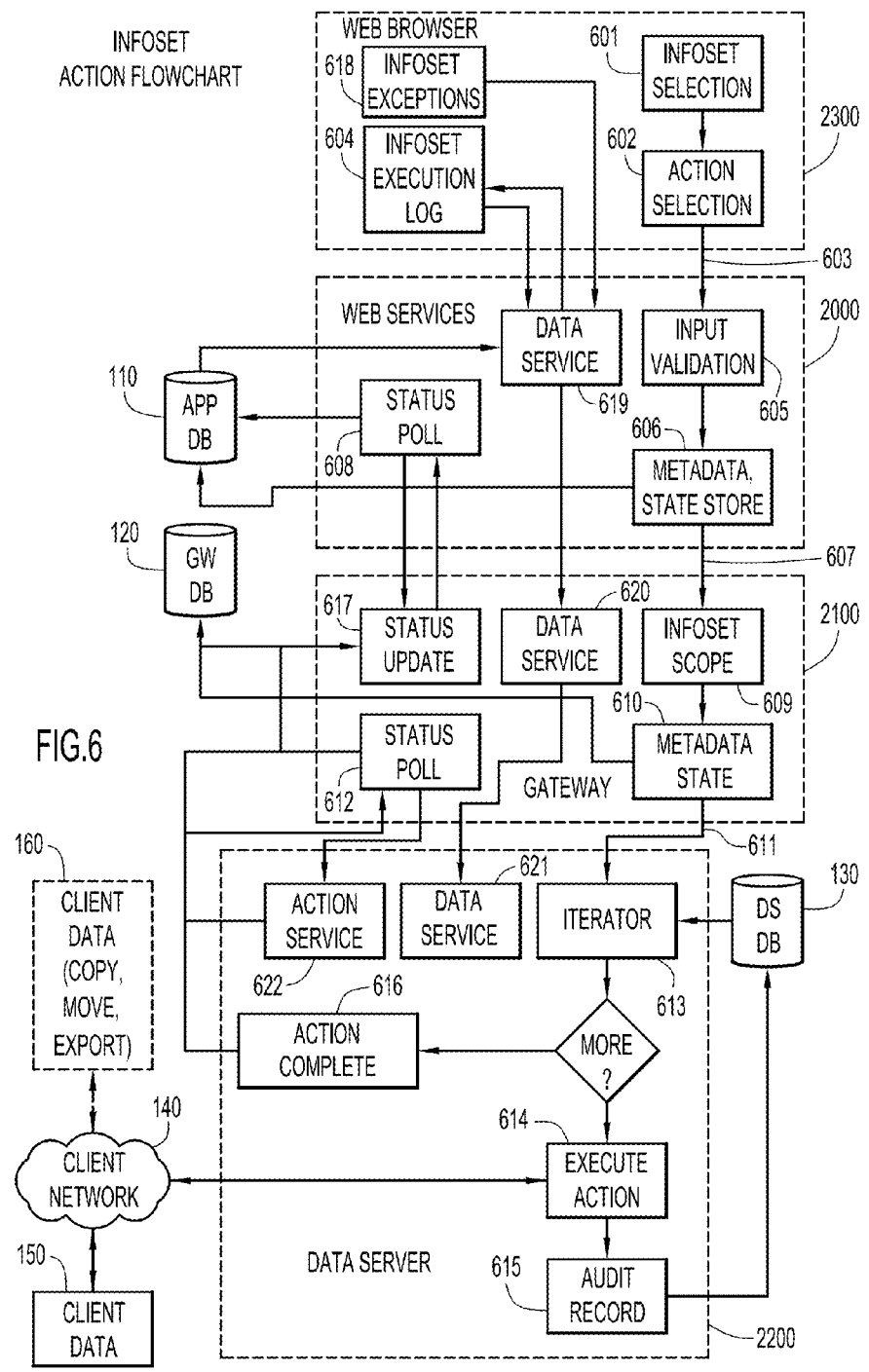
FIG. 6 is a flow diagram of an example manner of applying an operation against data designated by an information set according to an embodiment of the present invention.
Figure 7:
FIG. 7 is a schematic illustration of an example graphical user interface screen for selecting an operation to apply against data designated by an information set according to an embodiment of the present invention.

A manner of applying an operation against data designated by an information set according to an embodiment of the present invention is illustrated in FIGS. 6 and 7. Initially, at step 601, a user selects an information set via a browser-based graphical user interface screen 700 (FIG. 7) provided by a web browser of a client system 2300. For example, user interface screen 700 may include drop-down list control 310 for selecting an information set by name. User interface screen 700 may further include "Act" navigation bar option 720 to present list box 730 of predefined actions to apply. At step 602, the user selects the desired action (e.g., delete, export, move, copy, etc.). For example, the user may select delete operation 732 from list box 730. Users may define custom actions, e.g., using an action creation/editing interface. At step 603, the user initiates the action by actuating "Run Action" button 740. In one embodiment, the user confirms his or her intention in an additional step (e.g., in response to a pop-up dialog box). The user may monitor the state of the action at step 604 by periodically refreshing a view of the execution log in the browser.

At step 605, web services of application server 2000 validate the user input, and report any errors to the web client of client system 2300. At step 606, web services of application server 2001) store metadata and brief state information in application server database 110. At step 607, web services of application server 2000 instruct gateway

2100 to start execution of the specified action. At step 608, web services of application server 2000 initiate status polling for the action being executed in order to learn when the action is completed.

At step 609, gateway 2100 determines the scope of the work by identifying the specific data servers of data servers 2200 that will actually have to do the work. Available membership information of the information set and state information of the data servers are used for this purpose. At step 610, the gateway stores metadata and state information about the action in its gateway database 120. At step 611, the gateway instructs each participating data server to start the execution of the action. The data servers may perform their assigned work concurrently and independently from each other. At step 612, the gateway also initiates a polling process in order to detect any fatal condition (e.g. power loss) at the data servers. The data servers determine whether any fatal condition exists, and respond to the polling at step 622.

At step 613, the data servers create an iterator for the members of the specified information set by reading membership tags and additional parameters from its database, data server database 130. The iteration process receives parameters identifying an operation to be performed. When requesting a next item, items which already have the operation performed are by-passed and the next one needing the operation is returned. The data servers execute the specified action against each member object of the information set at step 614. Applying the actions requires the data servers to mount the servers on which the data 150, 160 resides (and/or should be transferred) via client network 140, and—based on the type of action—copy, delete, move, or export the affected objects. The data servers may employ multiple processes to carry out the action on multiple objects simultaneously. The results of the action on member objects are written as audit records into data server database 130 at step 615. The data servers notify the gateway at step 616 when the processing of the final object of the information set is complete.

The gateway receives this notification and updates the action's state information in gateway database 120 at step 617. This updated state information is then fed to the web services of application server 2000 when the web services ask for an update at step 608.

The action is considered complete when every participating data server is finished (or has stopped responding), and the state information is updated at the gateway and at the web services levels.

In one embodiment, when an object is deleted from a repository (e.g., from client data 150) using an information set, references to that data object are deleted from each information set that includes the object. Alternatively, the object may be removed from only the information set used to apply the delete operation unless no other information includes the object.

The user may view the details of exceptions of selected types via an "Exceptions View" of the information set at step 618. Web services of application server 2000 ask the gateway to return the requested types of exceptions and details of the failed objects at step 619. At step 620, the gateway fetches the requested information. The gateway retrieves the requested information from its local gateway database 120 in case the information has already been cached there. Otherwise, the gateway asks the data servers that participated in the execution of that action to provide the information, in which case the participating data servers identify and return the requested exceptions and details based on the audit records in data server database 130, at step 621. The user may create a new information set for the selected objects of the requested exceptions. In this manner, the user may investigate these objects later, and/or reattempt the same operation again just for those objects in case the cause of the exception was transient. The exceptions may be recorded in the information set's metadata, and may be of any type. For example, an exception may occur if a data object included in the information set cannot be accessed, has been changed since the information set was created, etc.).

Figure 8:
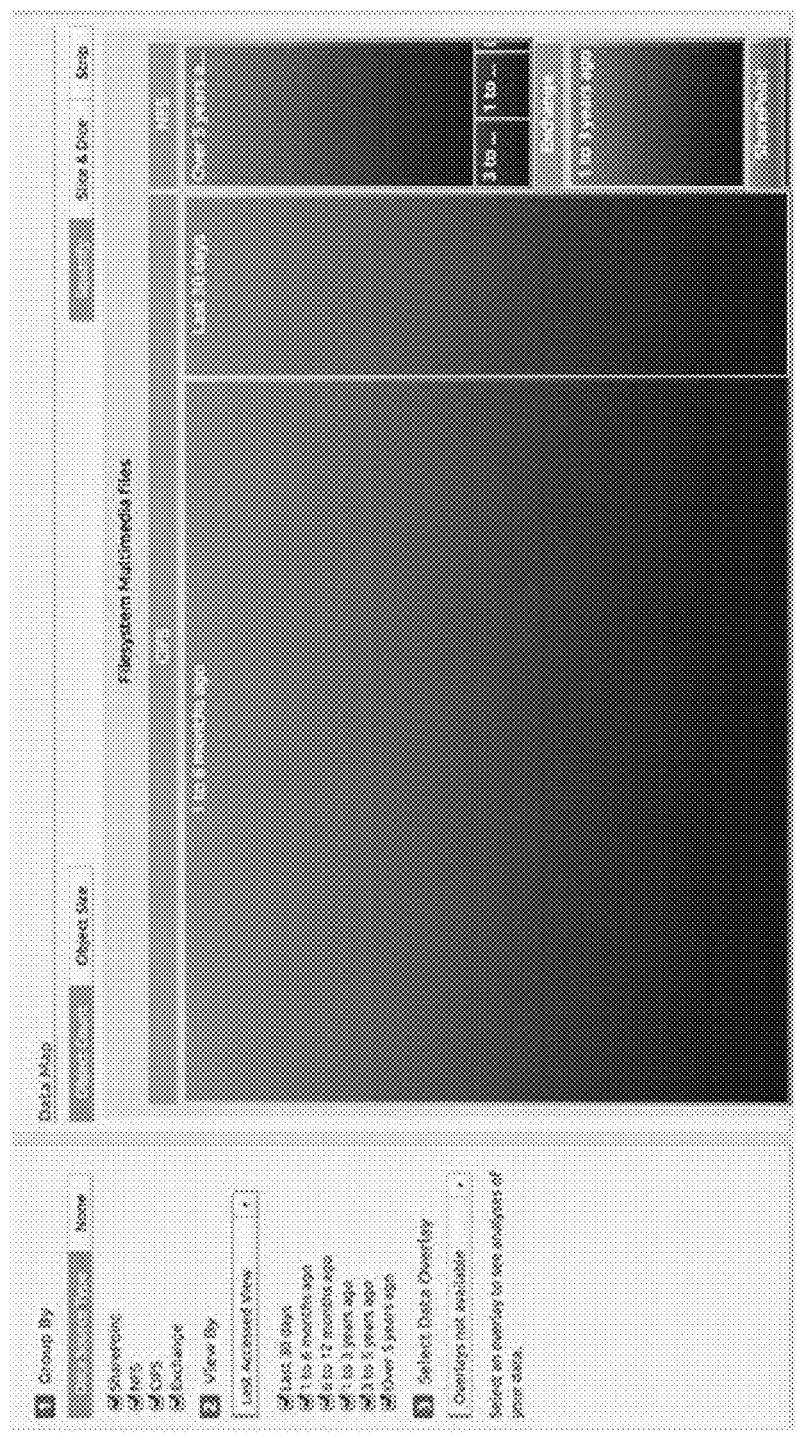
FIG. 8 is a schematic illustration of an example graphical user interface screen for viewing metadata for an information set in graphical form according to an embodiment of the present invention.

In addition, the user may view graphical representations of information set metadata. For example, a graphical view of the count of objects in an information set for multimedia files by data source and time since last access is illustrated in FIG. 8. The user elects to group the members of the information set by data source type (e.g., SharePoint, network file system (NFS), Common Internet File System (CIFS), and Exchange). Within each group, the objects are aggregated by time since last access (e.g., last 30 days, 1 to 6 months ago, 6 to 12 months ago, 1 to 3 years ago, 3 to 5 years ago, and over five years ago). The count of objects for each interval and group is represented by the area of a rectangle. Alternatively, the user may elect to display aggregated size of objects in the information set rather than counts and/or a different type of graph.

It will be appreciated that the embodiments described above and illustrated in the drawings represent only a few of the many ways of implementing embodiments for managing data using information sets.

The topology or environment of the present invention embodiments may include any number of computer or other processing systems, data storage systems, arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for managing any type of data (e.g., files, emails, databases, directories, tar files or other archives, zip files or other compressed data or data structures, etc.) and metadata (e.g., system defined, user defined, third party, etc.) for any purpose (e.g., electronic discovery, business analytics, academic research, etc.). Any form of indexing and index items may be used. Information sets may be represented using any types of data (e.g., integers, pointers, handles, etc.) and data structures (e.g., tables, arrays, lists, etc.), and may include any metadata (e.g., parent information sets, selection rules, author, timestamps, exceptions, etc.). Indexes may use any type of data objects and structures (e.g., tables, trees, etc.). In addition, any access technologies, algorithms, and/or data structures (e.g., hash tables, trees, etc.) may be used (e.g., to access a table of references given an information set identifier, to access data objects and/or associated metadata given a reference to a data object, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable. RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagams and/or flowchart illustration, can be implemented by special purpose hardware-based systems that perform the specified functions or acts, or combinations of special purpose hardware and computer instructions.

What is claimed is:

1. A computer-implemented method of managing data using a set of data objects comprising:
    generating an index including information about data objects stored in one or more data server systems comprising different types of indexed data repositories by accessing individual indexes associated with each of the one or more data server systems via adapters, wherein, in generating the index, the data objects stored in the data server systems remain intact and are not replicated;
    selecting member objects from among the data objects stored in the one or more data server systems by evaluating criteria against the information in the generated index, wherein the information in the generated index is derived from the one or more data server systems;
    creating an information set comprising an identifier of a parent information set and a collection of references to the member objects selected subsequent to the generating of the index by applying the criteria to candidates belonging to the parent information set and tagging the information in the generated index that is associated with the selected member objects with a set-identifier when the criteria are satisfied;
    associating the information set with the set-identifier;
    receiving a request to apply an action to a subset of the data objects stored in the one or more data server systems, wherein the request specifies the subset by including the set-identifier; and
    applying the action to the selected member objects referenced by the collection of references associated with the set-identifier within the request.

2. The computer-implemented method of claim 1, wherein the generated index includes an object-identifier for each of the data objects, and the references to the selected member objects comprise object-identifiers for the selected member objects.

3. The computer-implemented method of claim 1, wherein the generated index and the collection of references are immutable, such that the information set includes a representation of the criteria and the information in the generated index from when the collection of references was created.

4. The computer-implemented method of claim 1, wherein a set operation is performed on the information set and a second information set to create a third information set.

5. The computer-implemented method of claim 1, wherein the one or more data server systems comprise a plurality of distributed data server systems of different types.

6. The computer-implemented method of claim 1, wherein the information set further comprises one or more exceptions resulting from applying the action.

7. A system for managing data using a set of data objects comprising:
    a computer system including at least one processor configured to:
        generate an index including information about data objects stored in one or more data server systems comprising different types of indexed data repositories by accessing individual indexes associated with each of the one or more data server systems via adapters, wherein, in generating the index, the data objects stored in the data server systems remain intact and are not replicated;

select member objects from among the data objects stored in the one or more data server systems by evaluating criteria against the information in the index, wherein the information in the index is derived from the one or more data server systems;

create an information set comprising an identifier of a parent information set and a collection of references to the member objects selected subsequent to the generating of the index by applying the criteria to candidates belonging to the parent information set and tagging the information in the generated index that is associated with the selected member objects with a set-identifier when the criteria are satisfied;

receive a request to apply an action to a subset of the data objects stored in the one or more data server systems, wherein the request specifies the subset by including the set-identifier; and apply the action to the selected member objects referenced by the collection of references associated with the set-identifier within the request.

8. The system of claim 7, wherein the generated index includes an object-identifier for each of the data objects, and the references to the selected member objects comprise object-identifiers for the selected member objects.

9. The system of claim 7, wherein the generated index and the collection of references are immutable, such that the information set includes a representation of the criteria and the information in the generated index from when the collection of references was created.

10. The system of claim 7, wherein a set operation is performed on the information set and a second information set to create a third information set.

11. The system of claim 7, wherein the one or more data server systems comprise a plurality of distributed data server systems of different types.

12. The system of claim 7, wherein the information set further comprises one or more exceptions resulting from applying the action.

13. A computer program product for managing data using a set of data objects comprising:

a non-transitory computer readable storage medium having computer readable program code embodied therewith for execution on a processing system, the computer readable program code comprising computer readable program code configured to:

generate an index including information about data objects stored in one or more data server systems comprising different types of indexed data repositories by accessing individual indexes associated with each of the one or more data server systems via adapters, wherein, in generating the index, the data objects stored in the data server systems remain intact and are not replicated;

select member objects from among data objects stored in the one or more data server systems by evaluating criteria against the information in the index, wherein the information in the index is derived from the one or more data server systems;

creating an information set comprising an identifier of a parent information set and a collection of references to the member objects selected subsequent to the generating of the index by applying the criteria to candidates belonging to the parent information set and tagging the information in the generated index that is associated with the selected member objects with a set-identifier when the criteria are satisfied;

receive a request to apply an action to a subset of the data objects stored in the one or more data server systems, wherein the request specifies the subset by including the set-identifier; and apply the action to the selected member objects referenced by the collection of references associated with the set-identifier within the request.

14. The computer program product of claim 13, wherein the generated index includes an object-identifier for each of the data objects, and the references to the selected member objects comprise object-identifiers for the selected member objects.

15. The computer program product of claim 13, wherein the generated index and the collection of references are immutable, such that the information set includes a representation of the criteria and the information in the generated index from when the collection of references was created.

16. The computer program product of claim 13, wherein a set operation is performed on the information set and a second information set to create a third information set.

17. The computer program product of claim 13, wherein the one or more data server systems comprise a plurality of distributed data server systems of different types.

\* \* \* \* \*